// Patented Feb. 18, 1936

UNITED STATES PATENT OFFICE 2,031,206

COMPOUND AND COMPOSITIONS CONTAINING SAME

Bozetech C. Bren, Cedar Grove, N. J., assignor to Du Pont Viscoloid Company, Wilmington, Del., a corporation of Delaware No Drawing. Application February 28, 1934, Serial No. 713,375

16 Claims. (Cl. 106—40)

This invention relates to new compounds, process of preparing same, and compositions containing same and, more particularly, relates to sulfonamides having high boiling points and to plastic and coating compositions in which these sulfonamides are employed as plasticizers.

An object of the present invention is to provide new derivatives of aryl sulfonamides and to provide an economical process of preparing same. A further object is the preparation of coating and plastic compositions containing these new derivatives of aryl sulfonamides. Further objects of the invention will be apparent from the description given hereinafter.

The above objects are accomplished according to the present invention by reacting an aryl sulfonamide with an alkoxyalkyl halide in the presence of an alkali to form an alkoxyalkyl aryl sulfonamide and formulating coating and plastic compositions containing such compounds. Alternatively, the alkoxyalkyl aryl sulfonamide may be prepared by reacting an aryl sulfonyl halide with an alkoxyalkyl amine in the presence of an alkali.

In order to illustrate the preparation of the compounds according to the present invention, the following examples are given:

Example 1

Methoxypropyl p-toluene sulfonamide:—A mixture containing 171 g. p-toluene sulfonamide, 200 g. water and 40 g. sodium hydroxide was heated to 80° under a reflux condenser. One hundred twenty grams gamma-methoxypropyl chloride were slowly added, and the mixture was refluxed for 30 hours. The methoxypropyl chloride slowly reacted with the sodium p-toluene sulfonamide. The oily product was dissolved in dilute sodium hydroxide solution, decolorized, filtered and acidified with hydrochloric acid. The precipitated product, which is a solid when cold, was filtered off and air dried.

Example 2

Di-methoxyethyl p-toluene sulfonamide:— Mono-methoxyethyl p-toluene sulfonamide was prepared by the method outlined in Example 1. To convert this to di-methoxyethyl p-toluene sulfonamide, 230 g. were dissolved in 500 cc. of water containing 40 g. hydroxide. To this mixture was added 110 g. methoxyethyl chloride and the mixture was then refluxed under a condenser for 30-40 hours. The oily layer which separated consisted mainly of di-methoxyethyl p-toluene sulfonamide. It was washed with dilute sodium hydroxide solution to remove any of the mono derivative and was then heated to 130°/50 mm. vacuum to remove any volatile material. The remaining product was treated with decolorizing carbon and filtered. A pale yellow oil resulted.

Example 3

Bis-p-toluene sulfonamido-diethyl ether:—A mixture containing 342 g. p-toluene sulfonamide, 80 g. sodium hydroxide, 126 g. BB' di-chlorodiethyl ether, and 500 g. water was refluxed for 30-40 hours. The product separated as an insoluble solid. This material was separated, extracted several times with hot water, and finally crystallized from benzene.

An alternative method for the preparation of each of the above compounds is to use p-toluene sulfonyl chloride in place of the sulfonamide and to use the corresponding amine in place of the alkoxyalkyl chloride mentioned. For example, by using di-methoxyethyl amine and p-toluene sulfonyl chloride, di-methoxyethyl p-toluene sulfonamide may be prepared.

As will be understood by those skilled in this art, the method of preparation as illustrated by the above examples may be varied widely and the proportion of reactants may be either equimolecular or there may be an excess of either reactant. The invention relates broadly to the preparation of alkoxyalkyl aryl sulfonamides by reacting an aryl sulfonamide with an alkoxyalkyl halide in the presence of an alkali, or by the alternative method, reacting an aryl sulfonyl halide with an alkoxyalkyl amine in the presence of an alkali.

In place of the alkoxyalkyl halides employed in the above examples, halides of this class may be employed, such as methoxybutyl chloride, ethoxyethyl chloride, butoxyethyl chloride, ethoxyethoxyethyl chloride, and the corresponding bromides, iodides, and the like. Likewise, other alkoxyalkyl amines than those mentioned above could be employed, such as mono- and di-ethoxyethyl amine, mono, and di-butoxyethyl amine, and the like. Other aryl sulfonamides and aryl sulfonyl chlorides may be used, such as benzine, monochlorobenzene, dichlorobenzene, xylene, naphthalene, tetrahydronaphthalene and chloronaphthalene sulfonamides and sulfonyl chlorides.

The compounds coming within the scope of the present invention, namely, the alkoxyalkyl aryl sulfonamides, may be represented by the following formula:

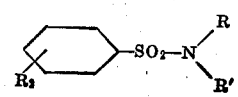

in which R represents an alkoxyalkyl radical, R' an alkoxyalkyl radical, an alkyl radical, or hydrogen, and $R_2$ a hydrocarbon radical, halogen, methoxy, ethoxy, and the like. When $R_2$ is a hydrocarbon radical it may be divalent and $R_2$ may be substituted in either ortho, meta, or para positions.

The aryl sulfonamides of the class herein described vary in physical properties from substantially colorless, oily liquids to white, crystalline solids and they are characterized by extremely high boiling points and low vapor pressures, as well as their high compatibility with cellulose derivatives. They are uniformly characterized by being more compatible with cellulose acetate than the usual alkyl substituted aryl sulfonamides heretofore known and because of this characteristic are of commercial value as plasticizers in various coating and plastic compositions. These compounds are soluble in the ordinary organic solvents and are miscible to an exceptional degree with other materials commonly used as plasticizers in the various plastics used commercially. These compounds are further characterized by their compatibility with various natural and synthetic resins, such as polyvinyl acetate, polymerized methyl methacrylate, polystyrene, polyhydric alcohol-polybasic acid resins, phenol aldehyde resins, and the various modified phenol aldehyde resins known in the art, and many natural resins, such as dammar, pontianac, kauri, elemi, shellac, and the like. Many of these compounds are also compatible with rubber and rubber derivatives.

The following examples are given in order to illustrate typical coating compositions containing compounds of the present invention as plasticizers, parts being given by weight:

Example 4

| | Parts |
|---|---|
| Cellulose nitrate | 12 |
| Dammar | 3 |
| Methoxybutyl p-toluene sulfonamide | 4 |
| Castor oil | 2.6 |
| Solvent | 166 |

Example 5

| | Parts |
|---|---|
| Polyvinyl acetate | 10 |
| Methoxyethyl p-chlorbenzene sulfonamide | 3 |
| Solvent | 100 |

Example 6

| | Parts |
|---|---|
| Cellulose acetate | 12 |
| Dimethoxyethyl p-toluene sulfonamide | 6 |
| Solvent | 182 |

Example 7

| | Parts |
|---|---|
| Ethyl cellulose | 10 |
| Resin | 6 |
| Butoxyethyl p-toluene sulfonamide | 6 |
| Paraffin wax | 2 |
| Solvent | 170 |

Example 8

| | Parts |
|---|---|
| Glyptal resin | 10 |
| Bis-p-toluene sulfonamido-diethyl ether | 4 |
| Solvent | 50 |

The above lacquers give films which dry in a few minutes, the films being characterized by their toughness, flexibility, and durability. By the term "solvent" in the above examples it is to be understood suitable mixtures of esters, alcohols, and hydrocarbons such as would be obvious to those skilled in the lacquer art.

Example 7 is of interest in that this composition possesses both definite moisture proofing properties and heat sealing properties. Compositions having similar properties may be obtained by substituting other cellulose derivatives for the ethyl cellulose.

Typical plastic compositions containing the compounds of the present invention as plasticizers are given in the following examples, parts being by weight:

Example 9

| | Parts |
|---|---|
| Cellulose acetate | 100 |
| Dimethoxyethyl p-toluene sulfonamide | 40 |

Example 10

| | Parts |
|---|---|
| Cellulose nitrate | 100 |
| Butoxyethyl p-chlorbenzene sulfonamide | 50 |
| Pigment (including color) | 200 |

Example 11

| | Parts |
|---|---|
| Ethyl cellulose | 100 |
| Methoxybutyl dichlorbenzene sulfonamide | 15 |

Example 12

| | Parts |
|---|---|
| Polymerized methyl methacrylate | 100 |
| Methoxyethyl tetrahydronaphthalene sulfonamide | 20 |

The above plastic compositions may be prepared with or without the usual volatile solvents, such as alcohol for cellulose nitrate compositions, acetone for cellulose acetate compositions, toluol-alcohol for the ether compositions, and the like. The above examples are merely illustrative and it is to be understood that other cellulose derivatives, other natural resins and other synthetic resins than those mentioned above may be used, including cellulose propionate, cellulose butyrate, cellulose aceto butyrate, benzyl cellulose, glycol cellulose, and similar cellulose derivatives, phenol aldehyde resins, polystyrene resins, resins produced by the condensation of ketones, and the like. Likewise, it is to be understood that any part of the plasticizer in the above examples may be replaced by other plasticizers coming within the scope of the present invention, or by one or more of the common plasticizers such as triacetin, camphor, dibutyl phthalate, tricresyl phosphate, dimethoxyethyl phthalate, and the like.

It has been noted that the plasticizers herein disclosed when used in combination with certain other plasticizers appear to effect a plasticizing action which is greater than the sum of the plasticizing action of the two plasticizers individually. In the following examples are illustrated compositions adapted for the casting of cellulose acetate films of the self-sustaining variety wherein this extraordinary plasticizing action has been observed:

Example 13

| | Parts |
|---|---|
| Cellulose acetate (56% acetic acid) | 70 |
| Butyl orthobenzoyl benzoate | 20 |
| Methoxy propyl paratoluene sulfonamide | 10 |

Example 14

| | Parts |
|---|---|
| Cellulose acetate (56% acetic acid) | 70 |
| Butyl orthobenzoyl benzoate | 20 |
| Methoxy butyl paratoluene sulfonamide | 10 |

Example 15

| | Parts |
|---|---|
| Cellulose acetate (56% acetic acid) | 70 |
| Butyl orthobenzoyl benzoate | 20 |
| Methoxy ethyl paratoluene sulfonamide | 10 |

The compounds of the present invention may be used advantageously in the preparation of all types of compositions containing cellulose derivatives and/or natural and synthetic resins. Specific uses which may be mentioned are the preparation of lacquers for coating metal and wood, dopes for coating fabrics, moistureproof lacquers for coating regenerated cellulose, and the preparation of plastic compositions to be used in the manufacture of toiletware, novelties, sheeting, rods, tubes, safety glass interlayers, and in lacquers for coating wire screen and the preparation of thin sheets for wrapping purposes.

Among the advantages of the herein described compounds for use as plasticizers may be especially mentioned their extremely high boiling points, low vapor pressures, and excellent water resistance. Further advantages lie in the great compatibility of these compounds with cellulose derivatives, natural and synthetic resins, and the characteristic of permanent flexibility and good durability imparted to plastic compositions of this type.

As many apparently widely different embodiments of this invention may be made without departing from the spirit and scope thereof, it is to be understood that the invention is not limited to the specific embodiments thereof except as defined in the appended claims.

I claim:

1. Composition comprising a cellulose derivative and a N-alkoxyalkyl aryl sulfonamide as a plasticizer therefor.
2. Composition comprising cellulose acetate and a N-alkoxyalkyl aryl sulfonamide as a plasticizer therefor.
3. Composition comprising cellulose acetate and a N-alkoxyethyl aryl sulfonamide.
4. Composition comprising cellulose acetate and a N-alkoxyethyl p-toluene sulfonamide.
5. Composition comprising cellulose acetate and a N-methoxyethyl p-toluene sulfonamide.
6. Composition comprising cellulose acetate and N-monomethoxyethyl p-toluene sulfonamide.
7. Composition comprising cellulose acetate and N-dimethoxyethyl p-toluene sulfonamide.
8. A plasticized composition containing a N-alkoxyalkyl aryl sulfonamide.
9. A composition comprising as an essential element thereof a N-alkoxyalkyl aryl sulfonamide.
10. A composition comprising as an essential element thereof a N-alkoxyethyl aryl sulfonamide.
11. A composition comprising as an essential element thereof a N-alkoxyethyl p-toluene sulfonamide.
12. A composition comprising as an essential element thereof a N-methoxyethyl p-toluene sulphonamide.
13. A composition comprising as an essential element thereof N-mono-methoxyethyl p-toluene sulfonamide.
14. A composition comprising as an essential element thereof N-di-methoxyethyl p-toluene sulfonamide.
15. A composition comprising polymerized methyl methacrylate and a N-alkoxyalkyl aryl sulfonamide.
16. A composition comprising polymerized methyl methacrylate and a N-alkoxyethyl aryl sulfonamide.

BOZETECH C. BREN.